United States Patent
Nakamura et al.

(10) Patent No.: US 6,620,067 B1
(45) Date of Patent: Sep. 16, 2003

(54) TENSIONER DEVICE

(75) Inventors: Kensuke Nakamura, Wako (JP); Sadao Kojima, Wako (JP); Atsushi Tanaka, Wako (JP); Shinji Yamada, Wako (JP); Hajime Maeda, Wako (JP); Hidehiko Kamiyama, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/868,896

(22) PCT Filed: Oct. 27, 2000

(86) PCT No.: PCT/JP00/07570
§ 371 (c)(1), (2), (4) Date: Jul. 6, 2001

(87) PCT Pub. No.: WO01/38757
PCT Pub. Date: May 31, 2001

(30) Foreign Application Priority Data

Nov. 24, 1999 (JP) .............................. 11-333328

(51) Int. Cl.[7] .............................. F16H 7/08; F16H 7/18
(52) U.S. Cl. .............................. 474/111; 474/140
(58) Field of Search .............................. 474/111, 140, 474/101, 133, 138, 113–117

(56) References Cited

U.S. PATENT DOCUMENTS

| | | | | |
|---|---|---|---|---|
| 1,666,882 A | * | 4/1928 | Weller | 474/111 |
| 3,276,282 A | * | 10/1966 | Duncan | 474/111 |
| 3,490,302 A | * | 1/1970 | Turner et al. | 474/111 |
| 5,266,066 A | * | 11/1993 | White | 474/111 |
| 5,286,234 A | * | 2/1994 | Young | 474/111 |
| 5,425,680 A | * | 6/1995 | Young | 474/111 |
| 5,711,732 A | | 1/1998 | Ferenc et al. | 474/111 |
| 5,984,815 A | * | 11/1999 | Baddaria | 474/111 |

FOREIGN PATENT DOCUMENTS

| | | | |
|---|---|---|---|
| EP | 581219 A1 | * 2/1994 | 474/111 |
| GB | 907983 | * 10/1962 | 474/111 |
| JP | 55-68657 | 12/1981 | |
| JP | 61-48655 | 3/1986 | |
| JP | 8-184358 | 7/1996 | |
| JP | 10-281244 | 10/1998 | |
| JP | 2000-170544 | 6/2000 | |
| JP | 2000-240462 | 9/2000 | |

* cited by examiner

*Primary Examiner*—Marcus Charles
(74) *Attorney, Agent, or Firm*—Arent Fox Kintner Plotkin & Kahn, PLLC

(57) ABSTRACT

A tensioner device 14 for an engine 1 comprises a support member 16, a blade shoe 17 coming into sliding contact with a timing chain 11 having a base end section 17a held by a cylinder block 3 and a tip end section 17b supported by the support member 16, and a leaf spring 18 held by the blade shoe 1 for pressing the blade shoe 17 against the timing chain 11 elastically. The support member 16 is formed integrally with the cylinder block 3. The tip end section 17b comes into sliding contact with a guide surface 16a formed on the support member 16 to be supported.

14 Claims, 4 Drawing Sheets

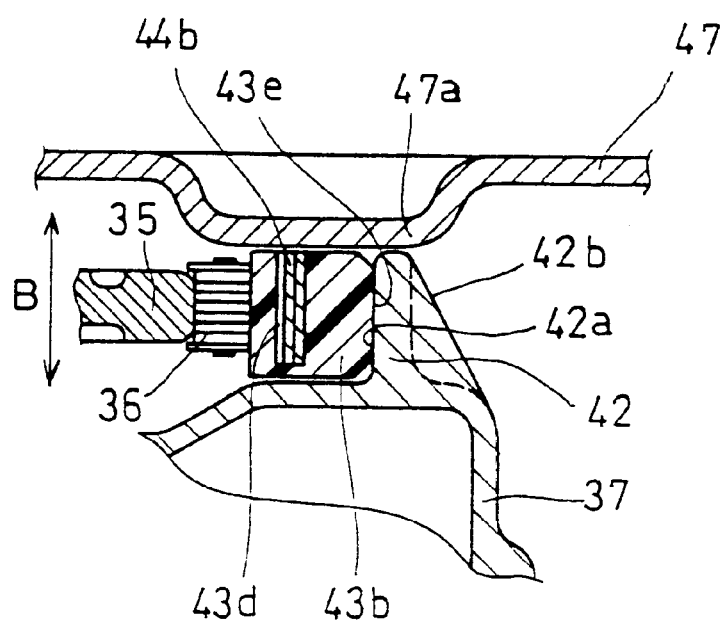

TENSIONER DEVICE

TECHNICAL FIELD

The present invention relates to a tensioner device of an transmission endless flexible member such as a chain and a belt used for transmitting power of a driving shaft of an engine to auxiliary machinery such as a valve moving apparatus or an oil pump to drive it.

BACKGROUND ART

Hitherto, a transmission endless flexible member such as a chain or a belt for transmitting power from a drive shaft of an engine has a tensioner device for adjusting tension of the endless flexible member automatically, in order to give a proper tension for transmitting power smoothly and in order to prevent vibration of the endless flexible member caused by change of tension of the endless flexible member owing to change of rotation of the driving shaft.

For example, in a chain tension adjusting apparatus disclosed in Japanese Laid-Open Patent Publication Sho 61-48655, a tension giving member consisting of a plate spring and a plastic plate joined together is brought into contact with a loose side of a chain wound round sprockets attached to a crankshaft and a valve driving cam shaft respectively. The tension giving member has a lower end pivoted to a crankcase and an upper end pivoted to a piston member of a tension adjusting mechanism. The piston member is fitted to a guide hole of a case formed on a cylinder head so as to slide, and forced by a coil spring held by a screw member so as to bent the tension giving member toward the chain for giving tension to the chain.

In the prior art disclosed in the above-mentioned publication, the upper end of the tension giving member for pressing the chain to give tension is supported by the piston member which is movable only in a direction to increase the tension of the chain, because loosing of the chain must be compensated.

Therefore, the above-mentioned tension adjusting mechanism is separated from the engine main body such as a cylinder head and the like, and the coil spring forcing the piston member and the screw member holding the coil spring are necessary, so that the construction for supporting the upper end of the tension giving member requires a large number of parts and is complicated.

DISCLOSURE OF INVENTION

The present invention has been accomplished in view of the foregoing, and an object of the inventions is to provide a tensioner device having a small number of parts and a simple construction. Another object of the invention is to improve rigidity of a support member on which a force acts from a tensioner shoe, a further object of the inventions is to prevent falling of the tension shoe in the width direction thereof, and the other object of the invention is to lubricate a sliding part for improving durability of the tensioner device.

The present invention provides a tensioner device including a support member provided on an engine main body, a tensioner shoe coming into sliding contact with a transmission endless flexible member having a base end section held by the engine main body and a tip end section supported by the support member so as to slide, and a spring pressing the tensioner shoe against the endless flexible member elastically, wherein the support member is formed integrally with the engine main body, and the tip end section is supported touching a guide surface formed on the support member so as to slide.

According to the invention, the support member supporting the tip end section of the tensioner shoe is formed integrally with the engine main body to reduce the number of parts, and the support member can be formed concurrently with the engine main body to reduce the cost. The support member is formed with only a guide surface coming into sliding contact with the tip end section and has no moving portion, so that the construction is simplified and the durability is improved.

Since the guide surface is formed on the support member which is formed integrally with the engine main body, there is no attachment error between the engine main body and the support member and positional relation between the guide surface and the tensioner shoe is set accurately, so that a tensioner device with good tension adjusting function having no substantial deflection for every engine can be obtained.

The tip end section can be set on the guide surface concurrently with attachment of the tensioner shoe to the engine main body, so that the tensioner device can be installed in the engine easily.

In the above-mentioned tensioner device, the support member may have a reinforcement section provided substantially along line of force acting on the guide surface of the support member from the tip end section.

Since force acting on the support member from the tip end section is received by the reinforcement section, rigidity of the support member can be raised to effect a stable tension adjusting function. Further, since the reinforcement section supports the majority of the force acting on the support member from the tip end section, a part of the support member hardly contributing to raise the rigidity can be made thin to make the engine light.

In the above-mentioned tensioner device, a projection for regulating displacement of the tensioner shoe in a width direction thereof by touching the tip end section may be provided on at least one of members positioned on both sides of the tip end section in the width direction.

The displacement of the tensioner shoe in the width direction, which is caused by movement of the endless flexible member since the tip end section slides on the guide surface, can be made minute by the tip end section touching the projection of the member positioned on a side of the tip end section in the width direction. Therefore, it is possible to prevent falling down of the tensioner shoe, and a stable tensioner function can be exhibited. Further, since the projection can be formed utilizing a member positioned in the neighborhood of the tip end section, for example a case covering the endless flexible member, or the engine main body, the falling down of the tensioner shoe can be prevented without increasing the number of parts. When the tensioner shoe with the base end section held by the engine main body is displaced, displacement is largest at the tip end section. According to this invention, displacement of the tensioner shoe is regulated at the tip end section, therefore displacement of the entire tensioner shoe can be made minute easily.

In the above-mentioned tensioner device, a projection for regulating displacement of the tensioner shoe in a width direction thereof by touching a member opposite to a side face of the tip end section may be provided on at least one of both sides of the tip end section in the width direction.

The displacement of the tensioner shoe, which is caused by movement of the endless flexible member since the tip end section slides on the guide surface, can be made minute by the projection on a side of the tip end section in the width direction touching the member opposite to the side of the tip end section. Therefore, it is possible to prevent falling down of the tensioner shoe, and a stable tensioner function can be exhibited. Further, since the projection is formed at the tip end section, the falling down of the tensioner shoe can be prevented easily even if the tip end section is in any position. When the tensioner shoe with the base end section held by the engine main body is displaced, displacement is largest at the tip end section. According to this invention, displacement of the tensioner shoe is regulated at the tip end section, therefore displacement of the entire tensioner shoe can be made minute easily.

Further, in the above-nebtioned tensioner device, the guide surface may have an upper guide surface portion extending upward from a touching position of the guide surface and the tip end section, a surface of the tip end section opposite to the guide surface may have an upper opposite surface portion extending upward from the touching position, and the upper guide surface portion and the upper opposite surface portion may form a space widened toward above to guide lubricating oil flowing onto the upper guide surface portion and the upper opposite surface portion to the touching position.

Lubricating oil flowing down from the above is caught in the widened space, and supplied to the touching section along the upper guide surface portion and the upper opposite surface portion for lubricating the touching position, so that abrasion of the support member and the tip end section can be reduced. As the result, durability of the support member and the tip end section can be improved, and a proper tension adjusting is possible over a long period of time.

In this description, the engine main body means at least one member among a cylinder block, a cylinder head, a crankcase, a cover to be attached to any one f the above members and a housing for an instrument to be driven by the engine which is integral with the cylinder block, the cylinder head, the crankcase or the cover by fixing or forming.

BRIEF DESCRIPTION OF DRAWINGS

FIG. 4 is a sectional view taken along the line IV—IV of FIG. 3.

BEST MODE FOR CARRYING OUT THE INVENTION

Figure 1:
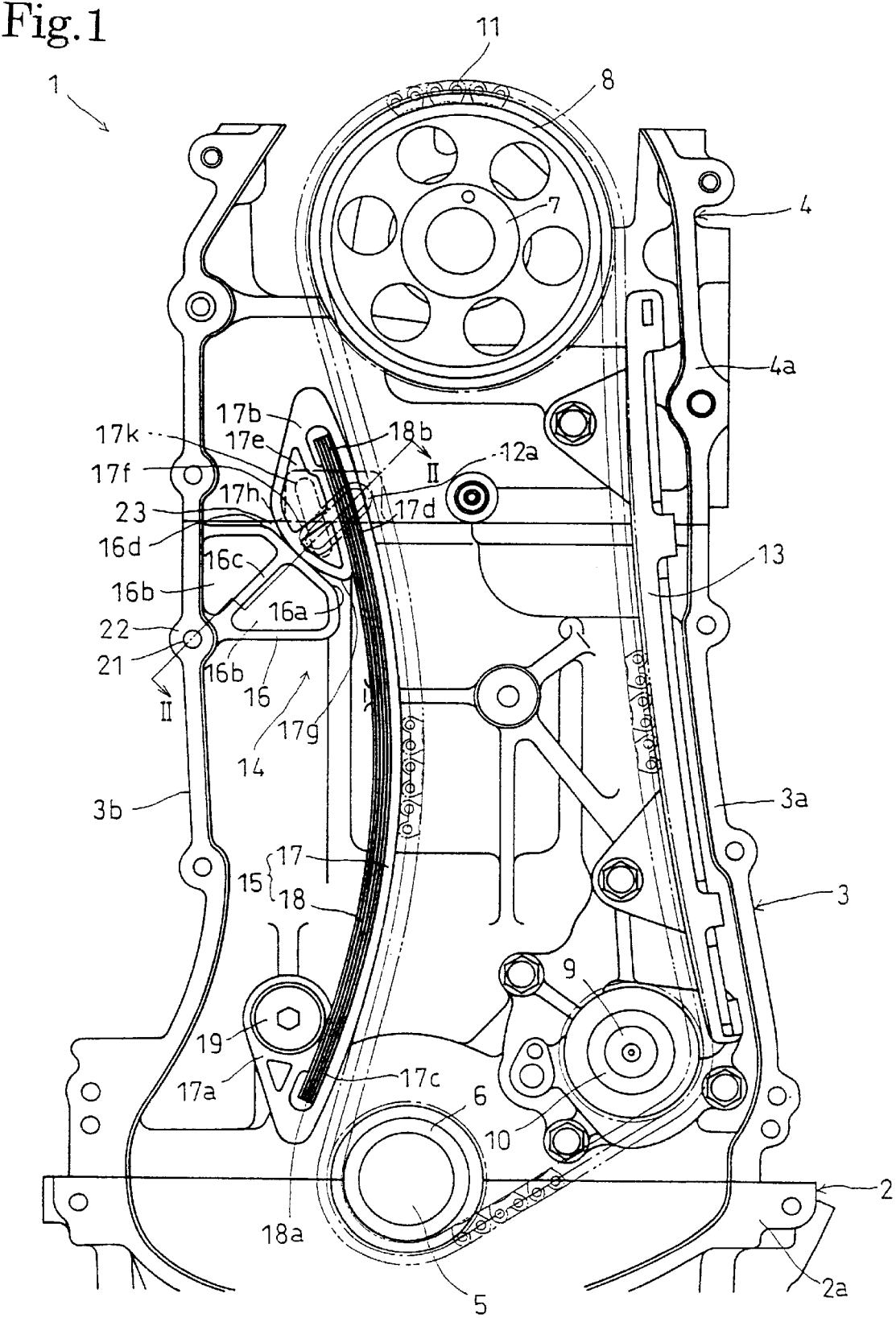
FIG. 1 is a side view of an essential part of an engine from which a chain case is removed, showing a first embodiment in which the present invention is applied to a cam chain.
Figure 2:
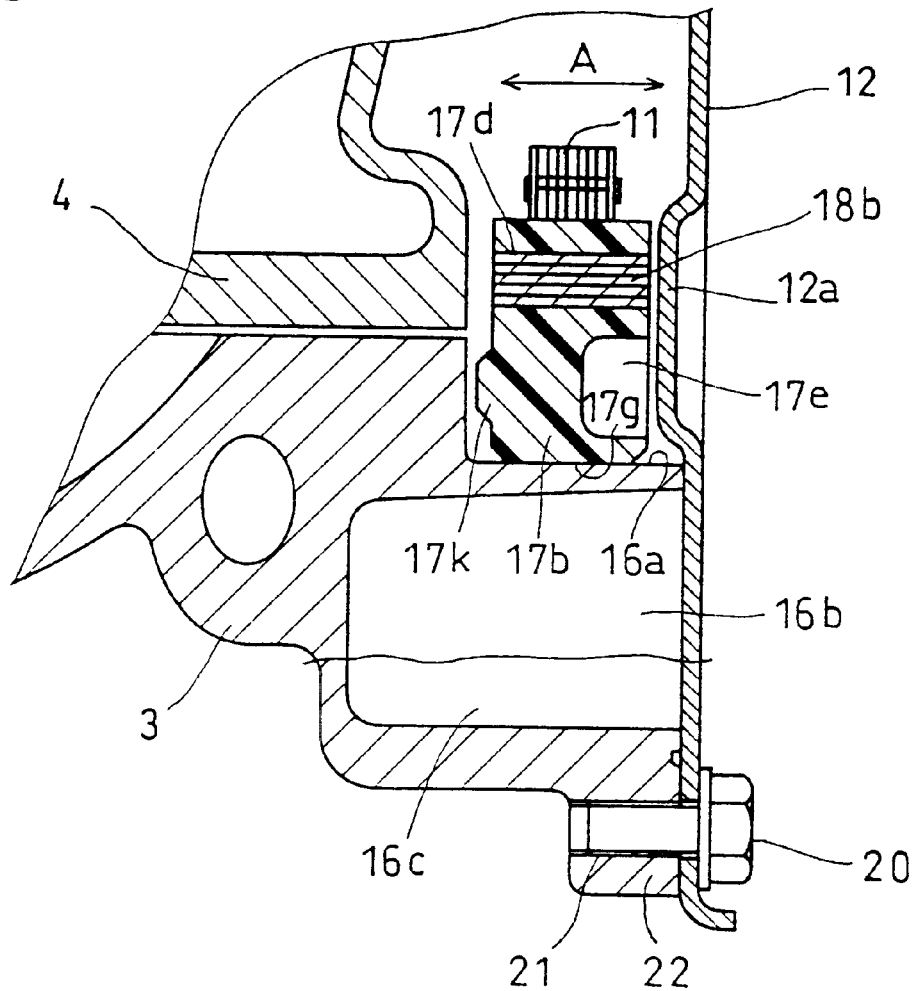
FIG. 2 is a sectional view taken along the line II—II of FIG. 2.

Hereinafter, some embodiments of the present invention will be described with reference to FIGS. 1 to 4. FIGS. 1 and 2 show the first embodiment. FIG. 1 is a side view of an engine from which a chain case is removed, and FIG. 2 is a sectional view taken along the line II—II of FIG. 1.

In the first embodiment, an engine 1 which is an overhead camshaft type internal combustion engine has a lower block (a lower crankcase) 2 attached with an oil pan (not shown) below, a cylinder block (a cylinder and an upper crankshaft) 3, a cylinder head 4 and a cylinder head cover (not shown), assembled being piled up in turn.

A camshaft 7 supported on the cylinder head 4 so as to rotate is driven at a rotational speed corresponding to ½ of a rotational speed of a crankshaft 5 by a timing chain (a transmission endless flexible member) 11 wound round a drive sprocket 6 attached to the crank shaft 5, a cam sprocket 8 attached to the camshaft 7 and a pump sprocket 10 attached to a rotary shaft 9 of an oil pump. The crankshaft 5 is a drive shaft, and the camshaft 5 and the rotary shaft 9 are driven shafts. The timing chain is covered by a chain case 12 (FIG. 2) which is fixed by bolts on contact surfaces 2a, 3a, 4a formed on the lower block 2, the cylinder block 3 and the cylinder head 4.

The timing chain 11 is given a proper tension automatically by a chain guide 13 coming into contact with the timing chain 11 at a tensile side between the cam sprocket 8 and the pump sprocket 10, and a tensioner device 14 having a blade shoe (tensioner shoe) 17 coming into contact with the timing chain 11 at a loosened side between the drive sprocket 6 and the cam sprocket 8.

The tensioner device 14 is composed of a tensioner main body 15 and a support member 16. The tensioner main body 15 is composed of a blade shoe 17 made of plastics, nylon for example, and a leaf spring 18 formed by a plurality of layers of plate springs, five layers in this embodiment, coming into contact with a back surface of the blade shoe 17 to press the blade shoe 17 against the timing chain 11 elastically. The leaf spring 18 is held to the blade shoe 17 at the both ends 18a, 18b inserted in grooves 17c, 17d formed at a base end section 17a and a tip end section 17b of the blade shoe 17, respectively. The plate springs are not necessarily fixed to each other, and may be merely piled up being separated from each other.

The blade shoe 17 has an arcuate side view and a predetermined width in a direction parallel with the axis of the crankshaft 5. The base end section 17a of the blade shoe 17 is pivotally supported by a support shaft 19 which is fixed to the cylinder block 3 at the neighborhood of the drive sprocket 6 attached to the crankshaft 5. The crankshaft 5 is disposed between the lower block 2 corresponding to a lower crankcase and a lower portion of the cylinder block 3 corresponding to an upper crankcase.

The tip end section 17b of the blade shoe 17 is positioned in a neighborhood of a contact surface between the cylinder block 3 and the cylinder head 4 striding the contact surface and supported by a guide surface 16a of the support member 16 which comes into sliding contact with the tip end section 17b. The tensioner main body 15 is pressed against the timing chain 11 by the guide surface 16a touching the tip end section 17b so that the blade shoe 17 comes into sliding contact with the timing chain 11. The timing chain 11 is given a proper tension by elastic force of the leaf spring 18.

The guide surface 16a is formed in a plane inclining obliquely downward toward the timing chain 11, so that when the timing chain 11 is loosened, the tensioner main body 15 is moved to press the timing chain 11 more. Degree of pressing given to the timing chain 11 by elastic force of the leaf spring 18 can be adjusted by degree of the inclination of the guide surface 16a.

Namely, when the timing chain 11 is loosened, the tip end section pinched between the guide surface 16a and the timing chain 11 slides on the guide surface 16a in a direction to press the timing chain 11, because curvature of the tensioner main body is increased by elastic force of the leaf spring 18. On the one hand, when the timing chain 11 is tensed, the tip end section 17b slides on the guide surface 16a in a direction contrary to the above.

The tip end section 17b positioned between the groove 17d holding the leaf spring 18 and the support member 16 is formed with a hollow 17e to lighten the tip end section 17b. Further, the tip end section 17b is formed with a reinforcement rib 17f extending substantially in a direction of line of reaction force from the support member 16 to give the tip end section 17b rigidity against the reaction force.

The support member 16 is positioned at a part of the cylinder block 3 near the cylinder head 4 and swells toward the inner side from a rear end wall 3b of the cylinder block 3. A hollow 16b is formed in the support member 16 so that the support member 16 is made as a swelling portion having a thin wall. The support member 16 is formed together with the cylinder block 3 when the cylinder block is cast.

The support member 16 has a reinforcement rib 16c in addition to the above-mentioned guide surface 16a on which the tip end section 17b of the blade shoe 17 slides in accordance with fluctuation of tension of the timing chain 11. The rib 16c extends substantially along line of force acting on the support member 16 from the tip end section 17b at a touching position of the guide surface 16a and the tip end section 17b. The rib 16c is formed so as to extend from an inner surface of the support member 16 opposite with the guide surface 16a to a thick boss section 22 of the rear end wall 3b of the cylinder block 3. The boss section 22 is formed with a tapped hole 21 engaging with a bolt 20 for attachment of the chain case 12 (FIG. 2).

The guide surface 16a has an upper guide surface portion 16d extending upward from the touching position of the guide surface 16a and the tip end section 17b within a predetermined extent. The curved surface 17g of the tip end section 17b opposite to the guide surface 16a has an upper opposite surface portion 17h extending upward from the touching position within a predetermined extent. The upper guide surface portion 16d and the upper opposite surface portion 17h form a wedge-shaped space 23 widened toward above to guide lubricating oil flowing onto the upper guide surface portion 16d and the upper opposite surface portion 17h to the touching position. The above-mentioned predetermined extent is set properly corresponding to shapes of the guide surface 16a and the opposite surface 17g in view of necessary supply of lubricating oil to the touching position.

A part of lubricating oil supplied for lubricating the timing chain 11 and the cam sprocket 8 positioned above the space 23, the drive sprocket 6 and the pump sprocket 10 drops to be caught in the space 23. The caught lubricating oil is supplied to the touching position directly or along the upper guide surface portion 16d and the upper opposite surface portion 17h.

As shown in FIG. 2, in a width direction A of the blade shoe 17, on a side face of the tip end section 17b near the cylinder block 3 is formed a long and slender projection 17k opposite to the cylinder block 3 and the cylinder head 4 (see FIG. 1, too). The gap between the tip end section 17b and the cylinder block 3 and the cylinder head 4 is made minute by the projection 17k and displacement of the tensioner main body 15 toward the cylinder block 3 and the cylinder head 4 is regulated to be minute. The gap between a portion of the tip end section 17b not formed with the projection 17k and the cylinder block 3 and the cylinder head 4 is set to an extent that the leaf spring 18 does not escape from the groove 17d in the width direction A.

The chain case 12 has a long and slender projection 12a projecting inside at a region in which the tip end section 17b moves sliding on the guide surface 16a in accordance with fluctuation of tension of the timing chain 11 (see FIG. 1, too). The gap between the tip end section 17b and the chain case 12 is made minute by the projection 12a, so that displacement of the tensioner main body 15 toward the chain case 12 is regulated to be minute. Movement of the leaf spring 18 from the groove 17d toward the chain case 12 is restrained by the projection 12a to prevent escape of the leaf spring 18.

The projections 17k, 12a extend so as to intersect each other in the side view as shown in FIG. 1, so that movement of the tensioner main body 15 in the width direction owing to change of tension of the timing chain is restrained small.

In the above-mentioned first embodiment, since the support member 16 supporting the tip end section 17b of the blade shoe 17 is formed integrally with the cylinder block 3 that is an engine main body, the number of parts is reduced and the cost can be reduced because the support member 16 can be formed concurrently with the cylinder block 3. Since the support member 16 is formed with only the guide surface 16a for coming into sliding contact with the tip end section 17b and no movable section, the construction is simple and the durability is improved.

Since the guide surface 16a is formed on the support member 16 which is formed integrally with the cylinder block 3, there is no attachment error between the cylinder block 3 and the support member 16 and positional relation between the guide surface 16a and the tip end section 17b of the blade shoe 17 is set accurately, so that a tensioner device 14 with good tension adjusting function having no substantial deflection at every engine can be obtained.

The tip end section 17b can be set on the guide surface 16a concurrently with attachment of the leaf blade 17 holding the leaf spring 18 to the cylinder block 3, so that the tension device 14 can be installed in the engine 1 easily.

Since the base end section 17a of the blade shoe 17 is held by the cylinder block 3 and the support member 16 for supporting the tip end section 17b is also formed on the same cylinder block 3, assembling accuracy is improved.

Since force acting on the support member 16 from the tip end section 17b is received by the rib 16c, rigidity of the support member 16 can be raised to effect a stable tension adjusting function. Further, since the rib 16c supports the majority of the force acting on the support member 16 from the tip end section 17b, a part of the support member 16 hardly contributing to raise the rigidity can be made in a thin construction with the hollow 16b to make the engine 1 light. In addition, the rib 16c extends up to the boss section 22 of the cylinder block 3 which is made thick for forming the tapped hole 21 engaging with the bolt 20, so that a large force can be received sufficiently.

Since the tip end section 17b formed with the hollow 17e is light in weight, the tensioner main body 15 follows movement of the timing chain 11 owing to fluctuation of tension well. The tip end section 17b has a high rigidity in spite of its light weight, because the tip end section 17b has the rib 17f formed in a direction substantially along line of reaction force from the support member 16 to give rigidity for encountering the reaction force.

Displacement of the tensioner main body 15 toward the chain case 12 in the width direction A can be made minute by the long and slender projection 12a of the chain case 12 touching the tip end section 17b, therefore falling down of the tensioner main body 15 can be prevented and stable tensioner function can be effected. Since the projection 12a can be formed utilizing the chain case 12 positioned near the tip end section 17b, falling down of the tensioner main body 15 can be prevented without increasing the number of parts. Since the displacement is regulated at the tip end section 17b where the largest displacement occurs when the cylinder block 3 having the base end section 17a held to the cylinder block 3 is displaced, displacement of the entire tensioner main body 15 can be made minute easily.

Displacement of the tensioner main body 15 toward the cylinder block 3 and the cylinder head 4 can be made minute by the projection 17k of the tip end section 17b touching at least one of the cylinder block 3 and the cylinder head 4, therefore falling down of the tensioner main body 15 can be prevented and stable tensioner function can be effected. Since the projection 17k is formed on the tip end section 16b, the tip end section 16b can be brought into contact with at least one of the cylinder block 3 and the cylinder head 4 at every position so that falling down of the tensioner main body 15 can be prevented easily.

Since the projections 17k, 12a extend so as to intersect each other in the side view as shown in FIG. 1 so that movement of the tensioner main body 15 in the width direction owing to change of tension of the timing chain is restrained small, falling down of the tensioner main body 15 can be prevented surely at every position of the tip end section 17b.

Some of lubricating oil for lubricating the timing chain 11 and the sprockets 6, 8, 10 drops from the above and is caught in the space 23, then the caught lubricating oil is supplied to the touching position of the guide surface 16a and the tip end section 17b along the upper guide surface portion 16a and the upper opposite surface portion 17h. Therefore, abrasion of the guide surface 16a and the tip end section 17b can be reduced to improve durability of the support member 16 and the tip end section 17b and proper tension adjusting is possible over a long period of time.

Figure 3:
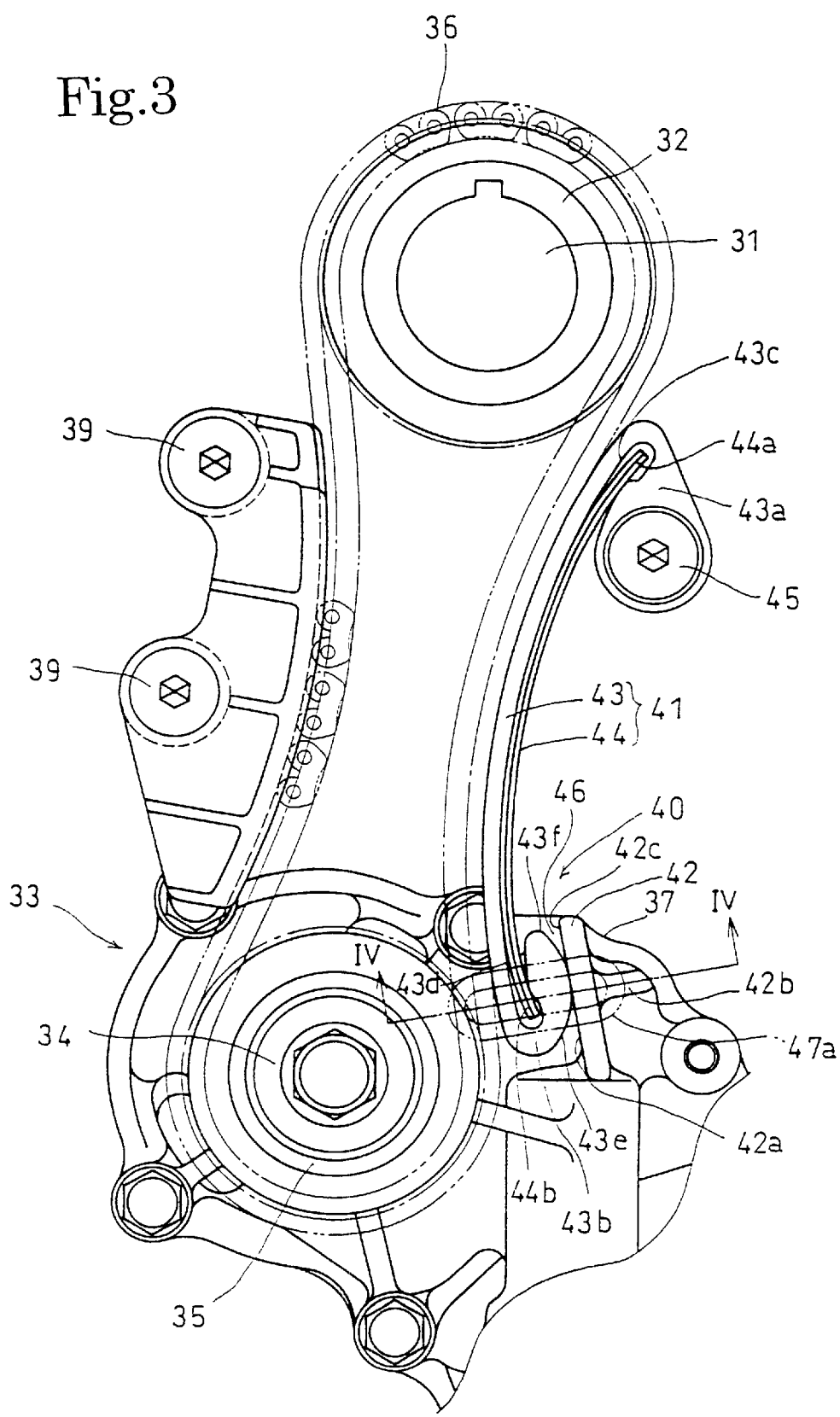
FIG. 3 is a side view of an essential part of an engine according to a second embodiment in which the present invention is applied to a chain for driving a oil pump.

Next, the second embodiment will be described with reference to FIGS. 3 and 4. FIG. 3 is a side view of an essential part of an engine, and FIG. 4 is a sectional view taken along the line IV—IV of FIG. 3.

As shown in FIG. 3, in the engine which is an internal combustion engine, a chain (transmission endless flexible member) 36 is wound round a drive sprocket 32 attached to a crankshaft 31 of the engine and a driven sprocket 35 attached to a rotary shaft 34 of a trochoid-type oil pump 33, for driving the oil pump 33. A pump housing 37 for housing a rotor of the oil pump 33 is fixed to a lower block by bolts. The crankshaft 31 is a drive shaft and the rotary shaft 34 is a driven shaft.

The chain 36 is given proper tension automatically by a chain guide 38 coming into sliding contact with the tensile side of the chain 36 and a tensioner device 40 having a blade shoe (tensioner shoe) 43 coming into sliding contact with the loosened side of the chain 36. The chain guide 38 is fixed to the lower block by bolts 39.

The tensioner device 40 is composed of a tensioner main body 41 and a support member 42. The tensioner main body 41 is composed of a blade shoe 43 made of plastics, nylon for example, and a leaf spring 18 formed by a plurality of layers of plate springs, two layers in this embodiment, coming into contact with a back surface of the blade shoe 43 to press the blade shoe 43 against the chain 36 elastically. The leaf spring 44 is held to the blade shoe 43 at both ends 44a, 44b inserted in grooves 43c, 43d formed at a base end section 43a and a tip end section 43b of the blade shoe 43 leaving thin walls on a side opposing to the pump housing 43, respectively. The plate springs are fixed to each other, or piled up being separated from each other.

The arcuate blade shoe 43 has a predetermined width in a direction parallel with the axis of the crankshaft 31. The base end section 43a is pivoted on a support shaft 45 fixed to the lower block. The tip end section 43b is supported by a guide surface 42a formed on the support member 43 which the tip end section 43b touches so as to slide. Therefore, the tensioner main body 41 is pressed by the chain 36 and the blade shoe 43 comes into sliding contact with the chain 36. At that time, the chain 36 is given proper tension by elastic force of the leaf spring 44.

The guide surface 42a is formed in a plane inclining obliquely upward toward the chain 36, so that when the chain 36 is loosened, the tensioner main body 41 is moved further in a direction to press the chain 36. In the second embodiment, since the distance between the crankshaft 31 and the rotary shaft of the oil pump 33 is short, the chain 36 is shorter than the timing chain 11 of the first embodiment and the tension fluctuation is also smaller. Therefore, inclination of the guide surface 42a is made relatively large so that the tensioner main body 41 can be moved corresponding to the tension fluctuation.

When the chain 36 is loosened, the tip end section 43b pinched between the guide surface 42a and the chain 36 slides on the guide surface 42a in a direction to press the chain 36, because curvature of the tensioner main body 41 is increased by elastic force of the leaf spring 44. On the one hand, when the chain 39 is tensed, the tip end section 43b slides on the guide surface 42a in a direction contrary to the above.

The support member 42 is formed as a flat wall projecting from an outer surface of the pump housing 37 in an axial direction of the crankshaft 31. The support member 42 is formed together with the pump housing 37 integrally when the pump housing 37 is cast.

The support member 42 has a reinforcement rib 42b in addition to the above-mentioned guide surface 42a on which the tip end section 43b of the blade shoe 43 slides in accordance with fluctuation of tension of the chain 36. The rib 42b is formed on a back surface of the support member 42 and extends substantially along a line of force acting on the support member 42 from the tip end section 43b at a touching position of the guide surface 42a and the tip end section 43b.

The guide surface 42a has an upper guide surface portion 42c extending upward from the touching position of the guide surface 42a and the tip end section 43b within a predetermined extent. The curved surface 43e of the tip end section 43b opposite to the guide surface 42a has an upper opposite surface portion 43f extending upward from the touching position within a predetermined extent. The upper guide surface portion 42c and the upper opposite surface portion 43f form a wedge-shaped space 46 widened toward above to guide lubricating oil flowing onto the upper guide surface portion 42c and the upper opposite surface portion 43f to the touching position. The above-mentioned predetermined extent is set properly corresponding to shapes of the guide surface 42a and the opposite surface 43e in view of necessary supply of lubricating oil to the touching position.

A part of lubricating oil supplied to the chain 36 and the drive sprocket 32 positioned above the space 46 and a part of lubricating oil supplied to the driven sprocket 35 and having lubricated the sprocket 35 drop in the space 46 to be caught. The caught lubricating oil is supplied to the touching position directly or along the upper guide surface portion 42c and the upper opposite surface portion 43f.

As shown in FIG. 4, the oil pan 47 has a long and slender projection 47a projecting inside at a region in which the tip end section 43b moves sliding on the guide surface 42a in accordance with fluctuation of tension of the chain 36 (see FIG. 3, too). The gap between the tip end section 43b and the oil pan 47 is made minute by the projection 47a, so that displacement of the tensioner main body 15 toward the oil pan 47 is regulated to be minute. Movement of the leaf spring 44 from the groove 43d toward the oil pan 47 is restrained by the projection 47a to prevent escape of the leaf spring 44.

The pump housing 37 positioned on another side in width direction B of the blade shoe 43 is opposite to the tip end section 43b through a minute gap to regulate movement of the tip end section 43b toward the pump housing 37.

In the second embodiment, since the distance between the crankshaft 31 and the rotary shaft 34 of the oil pump 33 is short and correspondingly length of the tensioner main body 41 is short, extent of movement of the tip end section 43b owing to tension fluctuation of the chain 36 is relatively narrow. Therefore, only one projection 47a is provided.

Next, effect of the second embodiment constituted as mentioned above will be described. Since the support member 42 supporting the tip end section 43b of the blade shoe 43 is formed integrally with the pump housing 37 namely an engine main body, the number of parts can be reduced. In addition, since the support member 42 can be formed concurrently with the pump housing 37, cost reduction is possible. The support member 42 has only the guide surface 42a which the tip end section 43b comes into sliding contact with, and no movable part. Therefore, the construction is simple and durability is improved.

Since the guide surface 42a is formed on the support member 42 which is formed integrally with the pump housing 37, there is no attachment error between the pump housing 37 and the support member 42 and positional relation between the guide surface 42a and the tip end section 43b of the blade shoe 43 is set accurately, so that a tensioner device 40 with good tension adjusting function having no substantial deflection at every engine can be obtained.

The tip end section 43b can be set on the guide surface 42a concurrently with attachment of the blade shoe 43 holding the leaf spring 44 to the lower block, so that the tensioner device 40 can be installed in the engine easily.

Force acting on the support member 42 from the tip end section 43b is received by the rib 42b, so that rigidity of the support member can be raised and stable tension adjusting function is effected.

Displacement of the tensioner main body 41 toward the oil pan 47 in the width direction B can be made minute by the long and slender projection 47a of the oil pan 47 touching the tip end section 43b, therefore, falling down of the tensioner main body 41 can be prevented and stable tensioner function can be effected. Since the projection 47a can be formed utilizing the oil pan 47 positioned near the tip end section 43b, falling down of the tensioner main body 41 can be prevented without increasing the number of parts. When the tensioner main body 41 having the base end section 43a held by the lower block is displaced, the largest displacement occurs at the tip end section 43b. Since the displacement is regulated at the tip end section 43b where the largest displacement occurs, displacement of the entire tensioner main body 41 can be made minute easily.

A part of lubricating oil for lubricating the chain 36 and the sprockets 32, 35 drops from the above and is caught in the space 46, then the caught lubricating oil is supplied to the touching position of the guide surface 42a and the tip end section 43b along the upper guide surface portion 42c and the upper opposite surface portion 43f. Therefore, abrasion of the guide surface 42a and the tip end section 43b can be reduced to improve durability of the support member and the tip end section 43b and proper tension adjusting is possible over a long period of time.

In the first embodiment, the projection for regulating displacement of the tensioner main body may be provided on a side face of the tip end section 17b near the chain case 12 in width direction A, or on at least one of the both side faces of the tip end section 17b in the width direction A. Or, the projection may be provided on the cylinder block 3 and the cylinder head facing a side of the tip end section 17b in the width direction A. The projection may be provided on the chain case 12.

In the second embodiment, the projection for regulating displacement of the tensioner main body may be provided on the pump housing 37 which is faces with a side of the tip end section 43b in the width direction B. The projection may be provided on at least one of the oil pan 47 and the pump housing 37. Further, the projection may be provided on the tip end section 43b in a similar manner to the first embodiment.

In the both embodiments, the projections 12a, 17k and 47a are formed integrally with the chain case 12, the tip end section 17b of the blade shoe 17 and the oil pan 47, respectively. But the projections 12a, 17k and 47a may be formed with respective members separated from the chain case 12, the tip end section 17b and the oil pan 47.

In the both embodiments, the base end sections 17a, 43a of the blade shoes 17, 43 are held to the support shafts 19, 45 so as to rotate. But the base end sections 17a, 34a may be fixedly held to the engine main body such as the cylinder block 3 or the pump housing 37. The base end sections 17a, 43a may be held to engine main bodies other than the cylinder block 3 and the lower block. The support members 16, 42 may be formed integrally with engine main bodies other than the cylinder block 3 and the pump housing 37.

In the both embodiments, the tensioner devices 14, 40 are applied to the timing chain 11 for driving the camshaft 7 and the chain 36 for driving the rotary shaft 31 of the oil pump 33, respectively. But the tensioner device may be applied to a chain for driving a balancer shaft. A belt may be used as the transmission endless flexible member in place of the chain.

Industrial Applicability

The present invention is applicable to an engine for adjusting tension of a transmission endless flexible member.

What is claimed is:

1. A tensioner device, comprising:
    a support member integrally formed on an engine main body, said support member protruding from the engine main body and providing a guide surface;
    a tensioner shoe that makes sliding contact with an endless flexible transmission member, said tensioner shoe having:
        a base end section pivotally supported by a shaft fixed to said engine main body, and
        a tip end section supported by and slidably contacting the guide surface of said support member for guided movement to displace the tensioner shoe relative to said endless flexible transmission member;
    a spring that elastically biases said tensioner shoe against said endless flexible transmission member; and a case provided on said engine main body and covering said support member, said tensioner and said endless flexible transmission member, wherein said case has a projection formed thereon and projecting inward to be adjacent said tip end section and wherein said case projection guides said tip end section in a direction wherein said tip end section is displaced for guided movement by said guide surface.

2. A tensioner device as claimed in claim 1, wherein said support member has a reinforcement section provided substantially along a line of force acting on said guide surface of said support member from said tip end section.

3. A tensioner device as claimed in claim 1 or 2, wherein a projection for regulating displacement of said tensioner shoe in a width direction thereof by touching said tip end section is provided on at least one of said tip end section and a chain case covering said endless flexible transmission member positioned on either side of said tip end section in said width direction.

4. A tension device claimed in claim 1 or 2, wherein a projection for regulating displacement of said tensioner shoe in a width direction thereof by touching a member opposite to a side face of said tip end section is provided on at least one of both sides of said tip end section in said width direction.

5. A tensioner device as claimed in claim 1 or 2, wherein said guide surface has an upper guide surface portion extending upward from a touching position of said guide surface and said tip end section, a surface of said tip end section opposite to said guide surface has an upper opposite surface portion extending upward from said touching position, and said upper guide surface portion and said upper opposite surface portion form a space widened toward above to guide lubricating oil flowing onto said upper guide surface portion and said upper opposite surface portion to said touching position.

6. A tensioner device according to claim 1, wherein said projection has an elongated shape and extends in said direction in which said tip end section is displaced for guided movement.

7. A tensioner device according to claim 1, further comprising a projection formed on a surface of said tip end section, remote from said projection on said case, said projection on said surface of said tip end section being positioned adjacent to an outer surface of said engine main body.

8. A tensioner device according to claim 7, wherein said projection on said case is elongated and extends in said direction in which said tip end section is displaced for the guided movement, and said projection on said surface of said tip end section is elongated and extends in a direction intersecting said projection on said case.

9. A tensioner device according to claim 7, wherein said support member protrudes from said engine main body.

10. A tensioner device according to claim 1, wherein said tip end section comprises a hollow space therein.

11. A tensioner device comprising:

a support member integrally formed on an engine main body, said support member protruding from the engine main body and providing a guide surface;

a tensioner shoe that makes sliding contact with an endless flexible transmission member, said tensioner shoe having:

a base end section pivotally supported by a shaft fixed to said engine main body, and a tip end section supported by and slidably contacting the guide surface of said support member for guided movement to displace the tensioner shoe relative to said endless flexible transmission member;

a spring that elastically biases said tensioner shoe against said endless flexible transmission member; and an oil pan provided adjacent said pump housing and having a projection formed on said oil pan and projecting inward to be adjacent to said tip ends section and guiding said tip end section in a direction in which said tip end section is displaced for guided movement by said guide surface.

12. A tensioner device according to claim 11, wherein said projection has an elongated shape and extends in said direction in which said tip end section is displaced for the guided movement.

13. A tensioner device according to claim 11, wherein said support member protrudes from said pump housing.

14. A tensioner device according to claim 11, wherein said guide surface is a flat surface.

* * * * *